United States Patent
Chang

[11] Patent Number: 6,097,808
[45] Date of Patent: Aug. 1, 2000

[54] AUTOMATIC DIALING METHOD

[75] Inventor: Hyun-Soon Chang, Seoul, Rep. of Korea

[73] Assignee: SamSung Electronics Co., Ltd., Suwon, Rep. of Korea

[21] Appl. No.: 09/044,013

[22] Filed: Mar. 19, 1998

[30] Foreign Application Priority Data

Mar. 19, 1997 [KR] Rep. of Korea ............... 97-9306

[51] Int. Cl.[7] .................. H04M 1/27; H04M 11/00
[52] U.S. Cl. ............ 379/355; 379/354; 379/100.14; 455/564
[58] Field of Search ................ 379/352–357, 379/100.14; 455/564–567

[56] References Cited

U.S. PATENT DOCUMENTS

| | | |
|---|---|---|
| 5,267,308 | 11/1993 | Jokinen et al. ............ 379/354 |
| 5,467,392 | 11/1995 | Norimatsu . |
| 5,483,591 | 1/1996 | Koma . |
| 5,509,067 | 4/1996 | Murata . |
| 5,541,988 | 7/1996 | Draganoff . |
| 5,568,546 | 10/1996 | Marutiak . |
| 5,592,546 | 1/1997 | Takahashi . |
| 5,636,270 | 6/1997 | Davey . |
| 5,644,633 | 7/1997 | Kaufeld et al. . |
| 5,677,949 | 10/1997 | Macor . |
| 5,677,950 | 10/1997 | Brendzel . |
| 5,963,875 | 10/1999 | Go ............................ 379/355 |

*Primary Examiner*—Wing F. Chan
*Attorney, Agent, or Firm*—Robert E. Bushnell, Esq.

[57] ABSTRACT

A facsimile, or telephone, according to the present invention predicts a telephone number to be dialed based on a number corresponding to a dial key depressed by a user, to automatically dial remaining numbers for the telephone number. The facsimile, or telephone, has a memory for storing telephone numbers and a number of dial keys. It is checked whether at least one of the dial keys is depressed by the user. If the user has depressed at least one of the dial keys, the facsimile, or telephone, generates a dual tone multi-frequency signal corresponding to the dial key depressed, and searches the memory for a telephone number corresponding to the dial key depressed. Thereafter, the facsimile, or telephone, displays the telephone number searched, and generates dual tone multi-frequency signals corresponding to remaining numbers for the telephone number searched, upon depression of an automatic dial key by the user.

17 Claims, 4 Drawing Sheets

AUTOMATIC DIALING METHOD

CLAIM OF PRIORITY

This application makes reference to, incorporates the same herein, and claims all benefits accruing under 35 U.S.C §119 from an application entitled Automatic Dialing Method earlier filed in the Korean Industrial Property Office on Mar. 19, 1997, and there duly assigned Ser. No. 97-9306 by that Office.

BACKGROUND OF THE INVENTION

1. Field of the Invention

The present invention relates to a facsimile or telephone including a central processing unit, and in particular, to a method for predicting a telephone number to be dialed based on a number corresponding to a dial key depressed by a user, to automatically dial remaining numbers for the telephone number.

2. Description of the Related Art

Currently, the use of a facsimile has gone from being widely used in an office to being widely used in the home. Further, a multifunction telephone including a central processing unit (CPU) is also widely used. In general, such a facsimile, or telephone, has a speed dialing function to allow a user to conveniently dial certain telephone numbers. The facsimile, or telephone, having the speed dialing function includes separate speed dial keys. A user stores, or registers, a plurality of telephone numbers in separate memory areas corresponding to the respective speed dial keys according to a speed dialing procedure programmed into the facsimile, or telephone. Thereafter, when dialing the stored telephone number, the user depresses the speed dial key corresponding to the telephone number that he desires to dial, to automatically and quickly dial the desired telephone number. There are a number of known automatic dialing methods as exemplified by the following U.S. patents: U.S. Pat. No. 5,467,392 to Noriko Norimatsu entitled Dialing Apparatus For Displaying Stored Character With Reduced Key Operations; U.S. Pat. No. 5,483,591 to Noriko Koma entitled Apparatus For Referring To A Content Of A Dial Memory In A Telephone Set; U.S. Pat. No. 5,509,067 to Yukio Murata entitled Method And Apparatus For Speed Dialing Via One-Touch And Two-Touch Operation; U.S. Pat. No. 5,541,988 to Georgi H. Draganoff entitled Telephone Dialler With A Personalized Page Organization Of Telephone Directory Memory; U.S. Pat. No. 5,568,546 to David J. Marutiak entitled Method And Apparatus For Dynamic Abbreviated Dialing Assignment; U.S. Pat. No. 5,592,546 to Kouichi Takahashi entitled Memory Dialing Control System Having Improved Telephone Number Retrieval Function By Using History Information; U.S. Pat. No. 5,636,270 to Melville G. Davey entitled Method Of Producing Signals Commonly Used With Telephones; U.S. Pat. No. 5,644,633 to James C. Kaufeld et al. entitled Automatic Telephone Dialer System; U.S. Pat. No. 5,677,949 to James Joseph Macor entitled Telephone With Minimal Switches For Dialing; and U.S. Pat. No. 5,677,950 to Henry Todd Brendzel entitled Telephone With Dial History Access.

The number of the telephone numbers that can be stored in memory, however, is limited according to the number of the speed dial keys that is available on the facsimile, or telephone. Further, a user needs to remember the corresponding speed dial key whenever dialing a specified telephone number. In addition, the user should remove an infrequently dialed telephone number from a stored list of telephone numbers and add a more frequently dialed telephone number to the list, whenever necessary.

SUMMARY OF THE INVENTION

It is therefore an object of the present invention to provide a method for predicting a telephone number to be dialed based on a number corresponding to one or more dial keys depressed by a user, to automatically dial the remaining numbers for the telephone number.

According to an aspect of the present invention, a method for automatically dialing a telephone number in a facsimile, or telephone, having a memory for storing telephone numbers and a number of dial keys, includes the steps of checking whether at least one of the dial keys is depressed; generating a DTMF (dual tone multi-frequency) signal corresponding to the dial key depressed, when the dial key is depressed; searching the memory for a telephone number corresponding to the depressed dial key; displaying a telephone number found during the search; and automatically generating DTMF signals corresponding to remaining numbers for the telephone number searched, upon depression of an automatic dial key by a user.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings, wherein.

DETAILED DESCRIPTION OF THE PREFERRED EMBODIMENT

Figure 1:
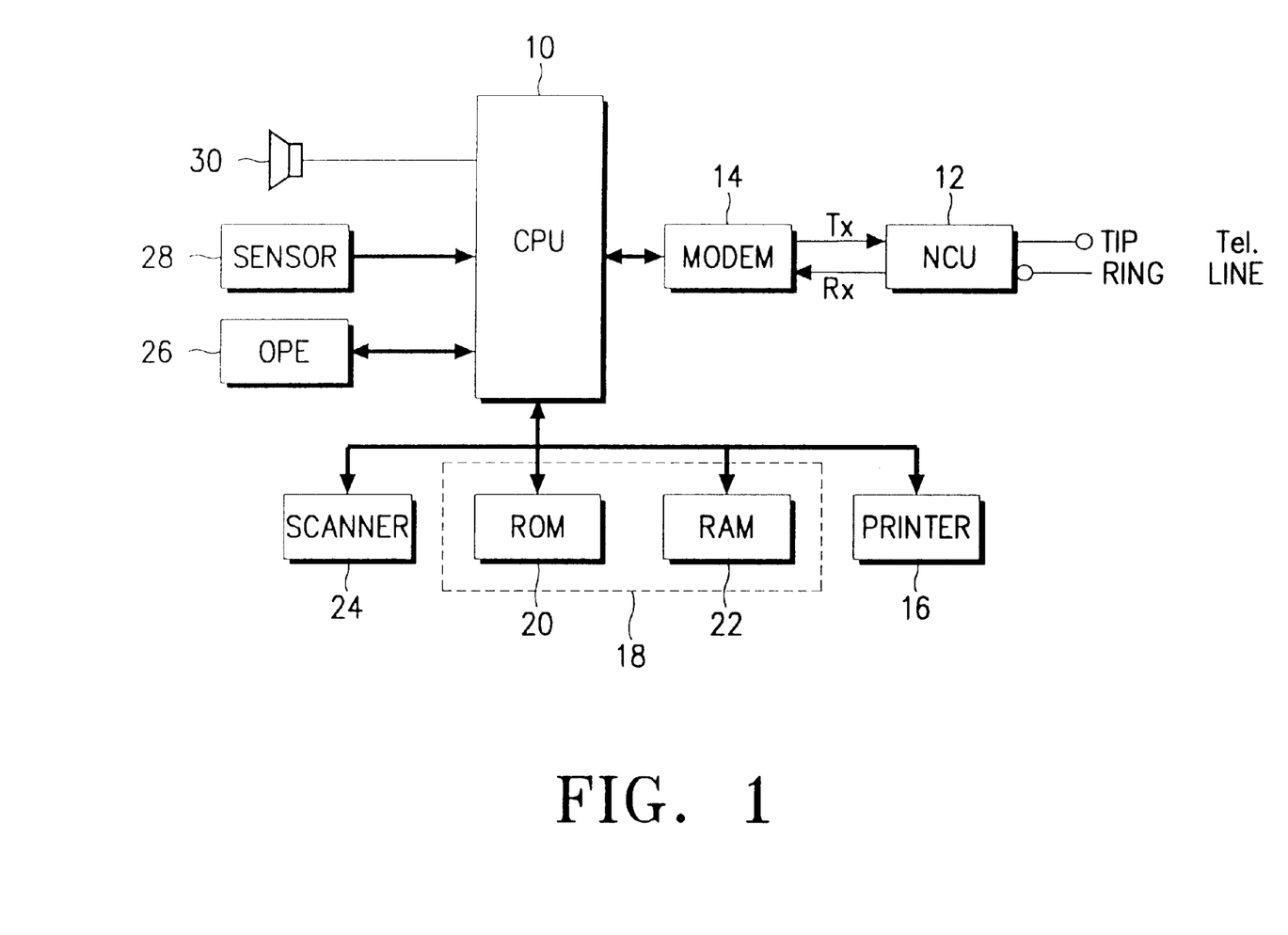
FIG. 1 shows a schematic block diagram of a facsimile to which the present invention is applicable.

Turning now to the drawings and referring to FIG. 1, a central processing unit 10 controls an overall operation of the facsimile and, in particular, an automatic dialing function according to the present invention. A network control unit (NCU) 12 connects a telephone line to a modem 14 to form a transmission loop under the control of CPU 10, and interfaces an analog modulation signal output from modem 14 and an analog signal input from the telephone line. Modem 14 modulates a signal output therefrom and demodulates a signal input thereto, under the control of CPU 10. A memory 18 includes a ROM (read only memory) 20 and a RAM (random access memory) 22. ROM 20 stores the control program of CPU 10 and, in particular, a control program for executing the automatic dialing function according to the present invention. RAM 22 stores transmission/reception data of the facsimile and, in particular, a number of telephone numbers according to the present invention. An operating panel equipment (OPE) 26 includes a number of keys for interfacing between the user and CPU 10, and a display for displaying a control status of the facsimile under the control of CPU 10. A scanner 24 scans an original document under the control of CPU 10, and provides CPU 10 with the digital image data scanned. A printer 24 prints the image data under the control of CPU 10. A sensor 28 senses each part of the facsimile, and provides CPU 10 with the sensing data. A speaker 30 generates a ring tone under the control of CPU 10.

Figure 2:
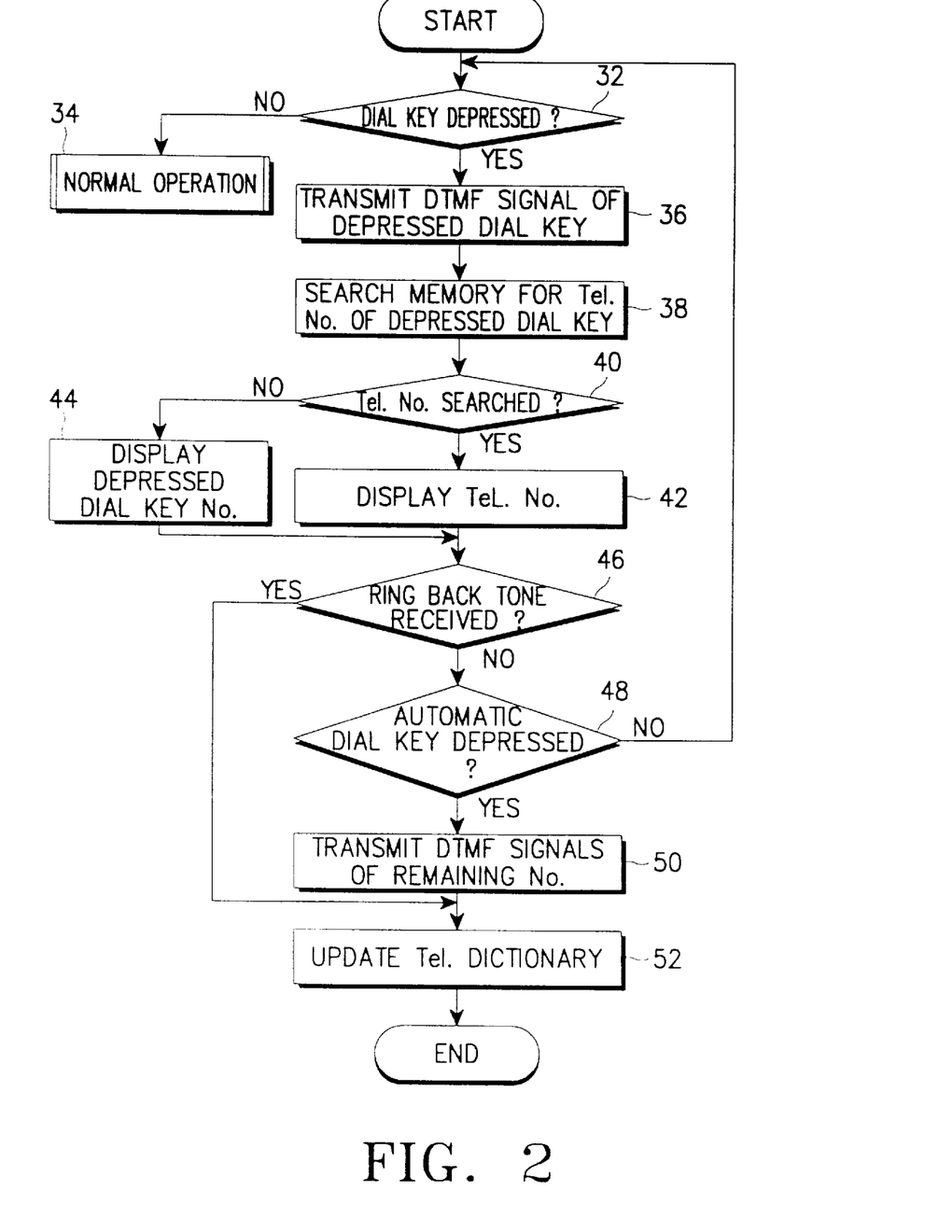
FIG. 2 shows a flow chart for automatically dialing a telephone number according to a preferred embodiment of the present invention.
Figure 3:
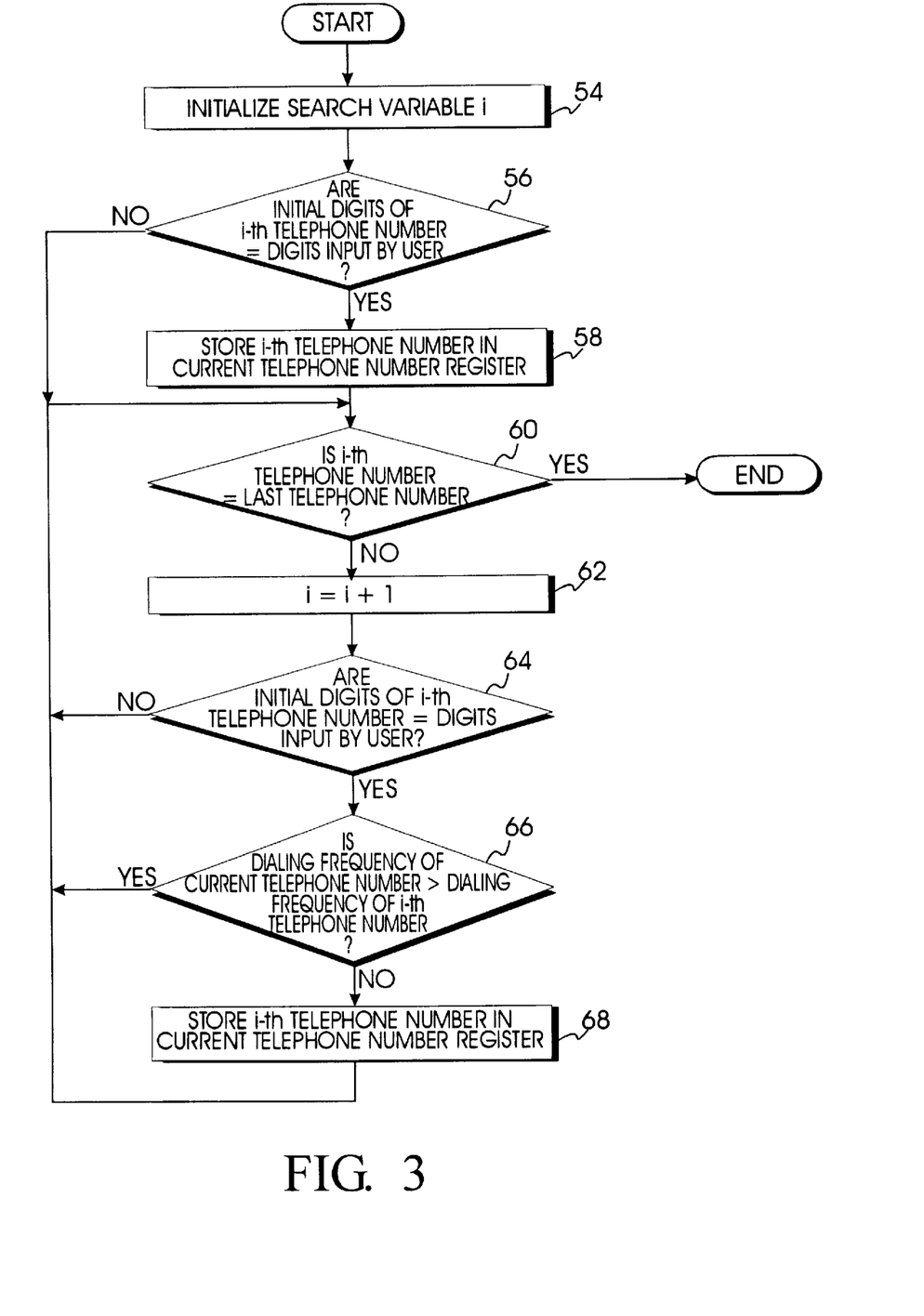
FIG. 3 shows a flow chart for specifically explaining the preferred embodiment of a telephone number search procedure of FIG. 2.

Referring now to FIG. 2, when a user activates an off-hook mode (START) in the facsimile, CPU 10 checks at step 32 whether the user has depressed a dial key or not. If the user has depressed the dial key, CPU 10 generates a DTMF (dual tone multi-frequency) signal corresponding to the dial key depressed by the user by means of a dialer (not shown) and transmits the DTMF signal to the telephone line, at step 36. Here, a term "dialing" refers to a transmitting operation of the DTMF signal to a telephone exchange system. After transmission of the DTMF signal, CPU 10 searches a telephone directory stored in RAM 22 for telephone numbers corresponding to the dial key(s) thus far depressed by the user, at step 38 (explained further with respect to FIG. 3A). If the telephone directory has telephone numbers corresponding to the depressed dial keys, CPU 10 checks those telephone numbers in a search for a telephone number which is the most frequently dialed telephone number of the telephone numbers found during the search of the telephone directory. Following the telephone number search, at step 40 it is determined whether the telephone number search resulted in finding a telephone number corresponding to the dial keys thus far depressed by the user in the telephone directory. CPU 10 displays the numbers corresponding to the dial keys thus far depressed by the user on the display of OPE 26, at step 44, when the search fails to find a corresponding telephone number. When step 40 indicates that the telephone directory has a corresponding telephone number, however, CPU 10 displays on the display of OPE 26 the numbers corresponding to the dial keys thus far depressed by the user together with the remaining numbers for the found telephone number, at step 42. Here, it is preferable to blink the numbers found by CPU 10 while the numbers corresponding to the dial keys depressed by the user are not blinked, so as to allow the user to easily recognize the numbers he/she dialed.

At step 46, CPU 10 checks whether the telephone exchange system has transmitted a ring signal to a called party corresponding to the DTMF signal (i.e., telephone number) dialed up to the present. That is, CPU 10 checks whether the telephone exchange system provides a ring back tone. If the telephone exchange system has not transmitted the ring signal to the called party, CPU 10 checks at step 48 whether the user has depressed an automatic dial key prepared on OPE 26 to dial the telephone number currently being displayed as a result of the search of the telephone directory stored in RAM 22. Since the DTMF signals corresponding to the dial keys thus far depressed by the user have been transmitted in step 36, when it is determined that the user has depressed the automatic dial key, CPU 10 transmits in sequence the DTMF signals corresponding to the remaining numbers, i.e., the numbers found by CPU 10 corresponding to the dial keys thus far depressed, at step 50. After transmission of the DTMF signals in step 50, CPU 10 updates the telephone directory at step 52 (explained further with respect to FIG. 4), and completes the procedure.

In accordance with the present invention, the CPU 10 adaptively constructs the telephone directory on the basis of the frequently dialed telephone numbers, and when storage space is limited, deletes, or removes, the telephone numbers which are not frequently used, or have not been used for a long time, from the telephone directory.

The telephone directory is stored in the RAM 22, and Table 1 illustrates a memory map of the telephone directory by way of example.

TABLE 1

|         | 1st Tel. No. |
| --- | --- |
| 1st Area | Dialing Frequency for 1st Tel. No. |
|         | Latest Dialing Date of 1st Tel. No. |
| 2nd Area | 2nd Tel. No. |
|         | Dialing Frequency for 2nd Tel. No. |
|         | Latest Dialing Date of 2nd Tel. No. |
| . | . |
| . | . |
| . | . |
| N-th Area | N-th Tel. No. |
|         | Dialing Frequency for N-th Tel. No. |
|         | Latest Dialing Date of N-th Tel. No. |

As shown in Table 1, the telephone directory includes a plurality of the telephone numbers sequentially stored therein, dialing frequencies for the respective telephone numbers, i.e., the number of times the respective telephone number has been dialed, and the latest dialing dates of the respective telephone numbers.

FIG. 3 shows a flow chart for specifically explaining step 38 of FIG. 2. At a step 54, CPU 10 initializes a search variable i, for searching for the telephone number, to zero. After initialization of search variable i, CPU 10 checks, at a step 56, whether the initial digits of an i-th telephone number stored in the RAM 22 are identical to the digits of the telephone number corresponding to the dial keys thus far depressed by the user. For example, in case the digits corresponding to the depressed dial keys are '123', CPU 10 checks whether the i-th telephone number has as its first three digits '123'. If the i-th telephone number has the first three digits of '123', CPU 10 recognizes that the i-th telephone number is the telephone number corresponding to the dial keys thus far depressed by the user and, in step 58, stores the i-th telephone number temporarily into a current telephone number register, and the telephone number stored in the current telephone number register is referred to as the current telephone number. Further, the dialing frequency for the current telephone number is stored into a dialing frequency register, and then step 60 is performed. The current telephone number register and the dialing frequency register were both initialized at the beginning of the procedure. If step 56 results in the negative (NO), the program jumps to step 60.

In step 60 it is determined whether the i-th telephone number is the last telephone number in the telephone directory, and if the i-th telephone number is the last telephone number in the telephone directory, the program ends and then step 40 of FIG. 2 is performed. If step 60 results in the negative (NO), CPU 10 increases the variable i by one (1), at step 62, and then, at step 64 compares the initial digits of the i-th telephone number to the digits input thus far by the user. If it is determined in step 64 that the initial digits of the i-th telephone number are not equal to the digits input thus far by the user, the program will return to step 60 following a negative (NO) response in step 64 so that all the stored telephone numbers will eventually be compared to the digits thus far input by the user because the telephone numbers are stored in the order entered instead of numerical order. If it is determined in step 64 that the initial digits of the i-th telephone number are equal to the digits input thus far by the user, then at step 64, the dialing frequency of the i-th telephone number is compared to the dialing frequency of the current telephone number, at step 66, and if the dialing frequency of the current telephone number is greater than the dialing frequency of the i-th telephone number the process returns to step 60. If the dialing frequency of the current telephone number is not greater than the dialing frequency of the i-th telephone number, then at step 68, the i-th telephone number is stored in the current telephone number register to become the current telephone number, and the dialing frequency for the current telephone number is stored into the dialing frequency register. Following step 68, the program returns to step 60 to determine whether the i-th telephone number is the last telephone number in the telephone directory.

Figure 4:
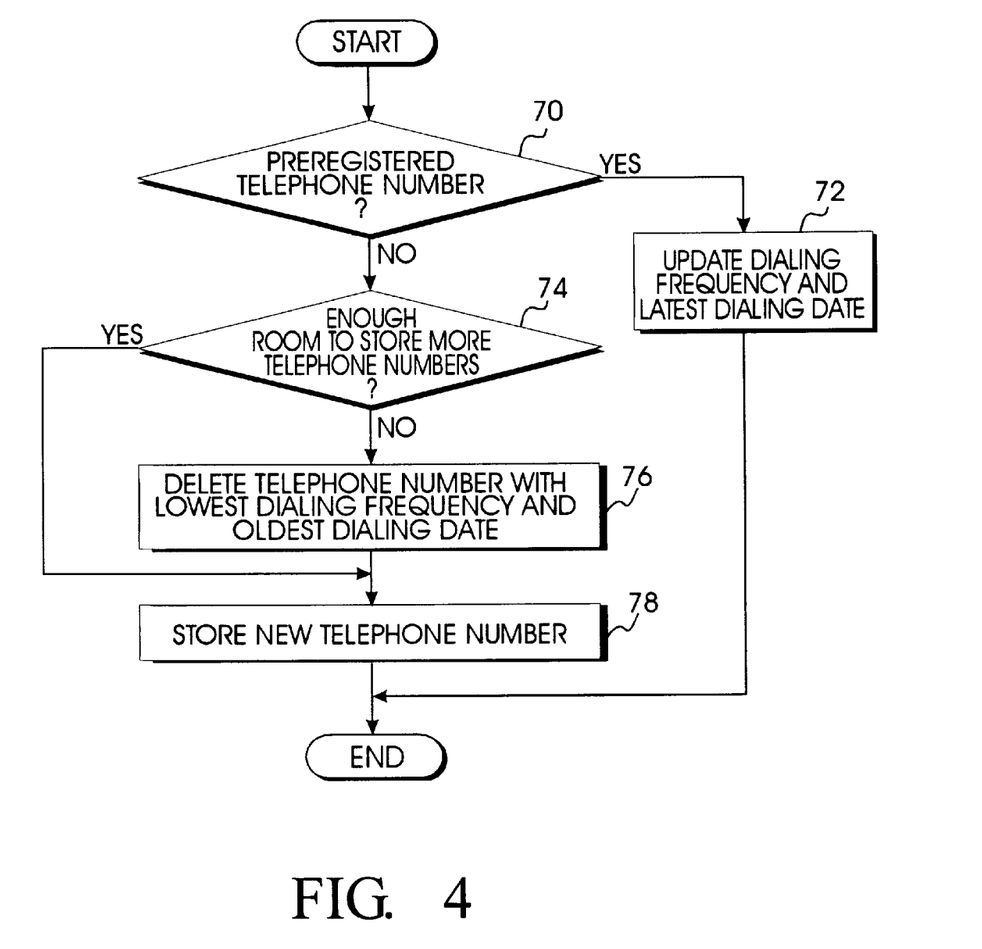
FIG. 4 shows a flow chart for specifically explaining a telephone number updating procedure of FIG. 2.

In the meantime, the details of the telephone directory is adaptively updated according to the dialing frequencies for the respective telephone numbers. FIG. 4 shows a flow chart for specifically explaining step 52 of FIG. 2. At step 70, CPU 10 checks whether the telephone number for the called party (see step 46 or step 50 of FIG. 2) is registered in the telephone directory. If the dialed telephone number is registered in the telephone directory, CPU 10 increases the dialing frequency for the dialed telephone number by one (1) and updates the latest dialing date, at step 72.

If the dialed telephone number is not registered in the telephone directory, CPU 10 checks at step 74 whether RAM 22 has enough room to store more telephone numbers. If RAM 22 does not have enough room to store more telephone numbers, CPU 10 deletes the telephone number having the lowest dialing frequency and/or the oldest dialing date from the telephone directory, at step 76. After deletion of the telephone number having the lowest dialing frequency and/ or the oldest dialing date, CPU 10 stores the newly dialed telephone number, a dialing frequency for the new telephone number, and a latest dialing date of the new telephone number in RAM 22, at step 78. Here it should be understood that the telephone numbers are stored in RAM 22 in the order entered, thus the telephone number being stored will be stored at the next available location in RAM 22.

In summary, if the user depresses one dial key (not the full dial keys) for a telephone number to be dialed, CPU 10 searches the telephone directory for the telephone number having the highest dialing frequency among the telephone numbers corresponding to the dial key depressed by the user, and displays the searched telephone number on the display of OPE 26. Here, CPU 10 distinguishably displays the number (i.e, digit) corresponding to the dial keys depressed by the user from the remaining numbers (i.e., digits) for the telephone number.

At the sight of the telephone number displayed on OPE 26, if the telephone number displayed is identical to the telephone number that the user desires to dial, the user will depress the automatic dial key to automatically dial the remaining numbers for the telephone number.

On the contrary, if the telephone number displayed is not identical to the telephone number that the user desires to dial, the user will depress a dial key corresponding to a next number for the telephone number. Then, CPU 10 searches the telephone directory for the telephone number having the first and second digits corresponding respectively to the first and second depressed dial keys, and displays the searched telephone number on OPE 26. Similarly, at the sight of the telephone number displayed on the OPE 26, if the telephone number now being displayed is identical to the telephone number that the user desires to dial, the user will depress the automatic dial key. Then, CPU 10 automatically dials the remaining numbers for the telephone number.

In general, the number of the telephone numbers that a user frequently dials is limited to a small number, and it is rare that the telephone numbers are similar to one another. Accordingly, with one or two key depressions by the user, CPU 10 may easily search for the telephone number that the user desires to dial. Thus, the user can dial the telephone number conveniently, without depressing all the dial keys corresponding to the telephone number.

If the telephone directory does not have the telephone number that the user desires to dial, CPU 10 will register the telephone number newly dialed by the user into the telephone directory after completion of the dialing, so as to allow the user to automatically dial the newly registered telephone number in the future.

As can be clearly appreciated from the foregoing descriptions, the facsimile, or telephone, according to the present invention registers the telephone numbers that the user frequently dials, so as to automatically dial the telephone number that the user desires to dial, even though the user depresses a couple of the dial keys of the telephone number. Further, the facsimile, or telephone, of the invention can register the telephone numbers unrestrictively.

Although a preferred embodiment of the present invention has been described in detail hereinabove, it should be clearly understood that many variations and/or modifications of the basic inventive concepts herein taught which may appear to those skilled in the art will still fall within the spirit and scope of the present invention as defined in the appended claims.

At the sight of the telephone number displayed on OPE 26, if the telephone number displayed is identical to the telephone number that the user desires to dial, the user will depress the automatic dial key to automatically dial the remaining numbers for the telephone number.

On the contrary, if the telephone number displayed is not identical to the telephone number that the user desires to dial, the user will depress a dial key corresponding to a next number for the telephone number. Then, CPU 10 searches the telephone directory for the telephone number having the first and second digits corresponding respectively to the first and second depressed dial keys, and displays the searched telephone number on OPE 26. Similarly, at the sight of the telephone number displayed on the OPE 26, if the telephone number now being displayed is identical to the telephone number that the user desires to dial, the user will depress the automatic dial key. Then, CPU 10 automatically dials the remaining numbers for the telephone number.

In general, the number of the telephone numbers that a user frequently dials is limited to a small number, and it is rare that the telephone numbers are similar to one another. Accordingly, with one or two key depressions by the user, CPU 10 may easily search for the telephone number that the user desires to dial. Thus, the user can dial the telephone number conveniently, without depressing all the dial keys corresponding to the telephone number.

If the telephone directory does not have the telephone number that the user desires to dial, CPU 10 will register the telephone number newly dialed by the user into the telephone directory after completion of the dialing, so as to allow the user to automatically dial the newly registered telephone number in the future.

As can be clearly appreciated from the foregoing descriptions, the facsimile, or telephone, according to the present invention registers the telephone numbers that the user frequently dials, so as to automatically dial the telephone number that the user desires to dial, even though the user depresses a couple of the dial keys of the telephone number. Further, the facsimile, or telephone, of the invention can register the telephone numbers unrestrictively.

Although a preferred embodiment of the present invention has been described in detail hereinabove, it should be clearly understood that many variations and/or modifications of the basic inventive concepts herein taught which may appear to those skilled in the art will still fall within the spirit and scope of the present invention as defined in the appended claims.

What is claimed is:

1. A method for automatically dialing a telephone number in a facsimile, or telephone, having a number of dial keys and a memory for storing telephone numbers, comprising steps of:

checking whether at least one of said dial keys is depressed by a user;

generating a dual tone multi-frequency signal corresponding to the dial key depressed, when the dial key is depressed;

searching said memory for a telephone number corresponding to said dial key depressed by said user;

displaying a number corresponding to the dial key depressed by said user in a first display state and numbers corresponding to the remaining digits of a telephone number found during said searching step in a second display state; and generating respective dual tone multi-frequency signals corresponding to each of said numbers displayed in said second display state, upon depression of an automatic dial key by a user.

2. The method as set forth in claim 1, wherein said memory comprises a random access memory and stores said telephone numbers in a telephone directory and also stores corresponding dialing frequency information regarding the number of times the respective telephone numbers have been dialed and information regarding the latest dialing dates of the respective telephone numbers.

3. The method as set forth in claim 2, further comprising step of updating said telephone directory after dialing any one of said telephone numbers.

4. The method as set forth in claim 1, wherein said second display state is a blinking display state.

5. The method as set forth in claim 2, wherein said searching step comprises steps of:

initializing a search variable i;

checking whether an i-th telephone number stored in said telephone directory comprises an initial number identical to the number corresponding to the dial key depressed by said user;

increasing said search variable by one, if said i-th telephone number stored in said telephone directory does not comprise an initial number identical to the number corresponding to the dial key depressed by said user; and repeating said step of checking whether an i-th telephone number stored in said telephone directory comprises an initial number identical to the number corresponding to the dial key depressed by said user.

6. The method as set forth in claim 3, wherein said updating step comprises steps of:

checking whether a telephone number corresponding to said dual tone multi-frequency signals is identical to any one of the telephone numbers stored in the telephone directory; and updating the dialing frequency information and the information regarding the latest dialing date for said telephone number stored in the telephone directory, if the telephone number corresponding to said dual tone multi-frequency signals is identical to any one of the telephone numbers stored in the telephone directory.

7. The method as set forth in claim 6, further comprising steps of:

checking whether said telephone directory has enough memory area to store more telephone numbers, if the telephone number corresponding to said dual tone multi-frequency signals is not identical to any one of the telephone numbers stored in the telephone directory;

storing said telephone number corresponding to said dual tone multi-frequency signals, corresponding dialing frequency information and latest dialing date information for said telephone number being stored in said telephone directory, if said telephone directory has enough memory area to store more telephone numbers; and deleting a telephone number having lowest dialing frequency information and an oldest dialing date information and then storing said telephone number corresponding to said dual tone multi-frequency signals, corresponding dialing frequency information and latest dialing date information for said telephone number being stored in said telephone directory, if said telephone directory does not have enough memory area to store more telephone numbers.

8. The method as set forth in claim 2, wherein said searching step comprises steps of:

checking whether a first telephone number stored in said telephone directory comprises an initial number identical to the number corresponding to the dial key depressed by said user;

storing said first telephone number in a current telephone number register as a current telephone number when it is determined that said first telephone number stored in said telephone directory comprises an initial number identical to the number corresponding to the dial key depressed by said user;

determining whether said current telephone number is a last telephone number stored in said telephone directory;

checking whether a second telephone number stored in said telephone directory comprises an initial number identical to the number corresponding to the dial key depressed by said user, when it is determined that said current telephone number is not said last telephone number stored in said telephone directory;

determining whether dialing frequency information corresponding to said current telephone number is greater than dialing frequency information of said second telephone number, when it is determined that said second telephone number stored in said telephone directory comprises an initial number identical to the number corresponding to the dial key depressed by said user;

repeating said step of determining whether said current telephone number is said last telephone number stored in said telephone directory, when it is determined that said dialing frequency information corresponding to said current telephone number is greater than said dialing frequency information of said second telephone number; and storing said second telephone number in said current telephone number register as said current telephone number, when it is determined that said dialing frequency information corresponding to said current telephone number is not greater than dialing frequency information of said second telephone number, and repeating said step of determining whether said current telephone number is said last telephone number stored in said telephone directory.

9. The method as set forth in claim 2, wherein said searching step comprises steps of:

initializing a search variable i;

checking whether an i-th telephone number stored in said telephone directory comprises an initial number identical to the number corresponding to the dial key depressed by said user;

storing said i-th telephone number in a current telephone number register as a current telephone number, when it is determined that said i-th telephone number stored in said telephone directory comprises an initial number identical to the number corresponding to the dial key depressed by said user;

determining whether said i-th telephone number is a last telephone number stored in said telephone directory;

increasing said search variable i by one, if said i-th telephone number is not said last telephone number stored in said telephone directory;

checking, after said step of increasing said search variable i by one, whether an i-th telephone number stored in said telephone directory comprises an initial number identical to the number corresponding to the dial key depressed by said user;

determining whether dialing frequency information corresponding to said current telephone number is greater than dialing frequency information of said i-th telephone number, when it is determined, after said step of increasing said search variable i by one, that said i-th telephone number stored in said telephone directory comprises an initial number identical to the number corresponding to the dial key depressed by said user;

repeating said step of determining whether said i-th telephone number is a last telephone number stored in said telephone directory, when it is determined that said dialing frequency information corresponding to said current telephone number is greater than dialing frequency information of said i-th telephone number; and storing said i-th telephone number in said current telephone number register as said current telephone number, when it is determined that said dialing frequency information corresponding to said current telephone number is not greater than dialing frequency information of said i-th telephone number, and repeating said step of determining whether said i-th telephone number is a last telephone number stored in said telephone directory.

10. The method as set forth in claim 9, further comprising a step of:

ending said searching step when it is determined that said i-th telephone number is a last telephone number stored in said telephone directory.

11. A method for automatically dialing a telephone number in a facsimile, or telephone, having a plurality of dial keys and a memory for storing telephone numbers and corresponding dialing frequency information for each of said telephone number as a stored telephone directory, comprising steps of:

generating a dual tone multi-frequency signal corresponding to each dial key depressed, by a user when dialing a telephone number;

searching said memory for a telephone number corresponding to said dial keys thus far depressed by said user each time said user depresses one of said dial keys;

determining whether said searching step resulted in finding a telephone number stored in said memory;

displaying in a first display state, on a display panel, numbers corresponding to said dial keys thus far depressed by said user when it is determined that said searching step did not result in finding a telephone number stored in said memory;

displaying in said first display state, on said display panel, said numbers corresponding to said dial keys thus far depressed by said user and displaying, in a second display state, numbers corresponding to the remaining numbers of said telephone number stored in memory, when it is determined that said searching step resulted in finding a telephone number stored in said memory;

generating respective dual tone multi-frequency signals corresponding to each of said numbers displayed in said second display state, upon depression of an automatic dial key by said user to finish dialing a telephone number; and updating said memory.

12. The method as set forth in claim 11, further comprising steps of:

determining whether a ring back tone has been received after either of said displaying steps;

determining whether said automatic dial key has been depressed by said user, when it is determined that no ring back tone has been received, and then generating said respective dual tone multi-frequency signals corresponding to each of said numbers displayed in said second display state; and performing said updating step when it is determined that said ring back tone has been received.

13. The method as set forth in claim 11, wherein said searching step comprises steps of:

checking whether a first telephone number stored in said telephone directory comprises an initial string of numbers identical to the string of numbers corresponding to the dial keys thus far depressed by said user;

storing said first telephone number in a current telephone number register as a current telephone number when it is determined that said first telephone number stored in said telephone directory comprises an initial string of numbers identical to the string of numbers corresponding to the dial keys thus far depressed by said user;

determining whether said current telephone number is a last telephone number stored in said telephone directory;

checking whether a second telephone number stored in said telephone directory comprises an initial string of numbers identical to the string of numbers corresponding to the dial keys thus far depressed by said user, when it is determined that said current telephone number is not said last telephone number stored in said telephone directory;

determining whether the dialing frequency information corresponding to said current telephone number is greater than dialing frequency information of said second telephone number, when it is determined that said second telephone number stored in said telephone directory comprises an initial string of numbers identical to the string of numbers corresponding to the dial keys thus far depressed by said user;

repeating said step of determining whether said current telephone number is said last telephone number stored in said telephone directory, when it is determined that said dialing frequency information corresponding to said current telephone number is greater than said dialing frequency information of said second telephone number; and storing said second telephone number in said current telephone number register as said current telephone number, when it is determined that said dialing frequency information corresponding to said current telephone number is not greater than dialing frequency information of said second telephone number, and repeating said step of determining whether said current telephone number is said last telephone number stored in said telephone directory.

14. The method as set forth in claim 11, wherein said searching step comprises steps of:

initializing a search variable i;

checking whether an i-th telephone number stored in said telephone directory comprises an initial string of numbers identical to the string of numbers corresponding to the dial keys thus far depressed by said user;

storing said i-th telephone number in a current telephone number register as a current telephone number, when it is determined that said i-th telephone number stored in said telephone directory comprises an initial string of numbers identical to the string of numbers corresponding to the dial keys thus far depressed by said user;

determining whether said i-th telephone number is a last telephone number stored in said telephone directory;

increasing said search variable i by one, if said i-th telephone number is not said last telephone number stored in said telephone directory;

checking, after said step of increasing said search variable i by one, whether an i-th telephone number stored in said telephone directory comprises an initial string of numbers identical to the string of numbers corresponding to the dial keys thus far depressed by said user;

determining whether dialing frequency information corresponding to said current telephone number is greater than dialing frequency information of said i-th telephone number, when it is determined, after said step of increasing said search variable i by one, that said i-th telephone number stored in said telephone directory comprises an initial string of numbers identical to the string of numbers corresponding to the dial keys thus far depressed by said user;

repeating said step of determining whether said i-th telephone number is a last telephone number stored in said telephone directory, when it is determined that said dialing frequency information corresponding to said current telephone number is greater than dialing frequency information of said i-th telephone number; and storing said i-th telephone number in said current telephone number register as said current telephone number, when it is determined that said dialing frequency information corresponding to said current telephone number is not greater than dialing frequency information of said i-th telephone number, and repeating said step of determining whether said i-th telephone number is a last telephone number stored in said telephone directory.

15. The method as set forth in claim 14, further comprising a step of:

ending said searching step when it is determined that said i-th telephone number is a last telephone number stored in said telephone directory.

16. The method as set forth in claim 11, wherein said updating step comprises steps of:

checking whether the dialed telephone number corresponding to said dual tone multi-frequency signals is identical to any one of the telephone numbers stored in the telephone directory; and updating the dialing frequency information for said dialed telephone number stored in the telephone directory, if the dialed telephone number corresponding to said dual tone multi-frequency signals is identical to any one of the telephone numbers stored in the telephone directory.

17. The method as set forth in claim 16, further comprising steps of:

checking whether said telephone directory has enough memory area to store more telephone numbers, if the dialed telephone number corresponding to said dual tone multi-frequency signals is not identical to any one of the telephone numbers stored in the telephone directory;

storing said dialed telephone number corresponding to said dual tone multi-frequency signals and corresponding dialing frequency information for said dialed telephone number being stored in said telephone directory, if said telephone directory has enough memory area to store more telephone numbers; and deleting a telephone number having the lowest dialing frequency information and then storing said dialed telephone number corresponding to said dual tone multi-frequency signals and corresponding dialing frequency information in said telephone directory, if said telephone directory does not have enough memory area to store more telephone numbers.

* * * * *